Aug. 9, 1955     D. C. STALEY     2,715,193

MOTOR STATOR AND METHOD OF MANUFACTURE

Filed March 2, 1954

INVENTOR.
Duward C. Staley

BY Craig V. Morton
Attorney

United States Patent Office 2,715,193
Patented Aug. 9, 1955

2,715,193

MOTOR STATOR AND METHOD OF MANUFACTURE

Duward C. Staley, Dayton, Ohio, assignor to General Motors Corporation, Detroit, Mich., a corporation of Delaware Application March 2, 1954, Serial No. 413,609

3 Claims. (Cl. 310—217)

This invention relates to improvements in laminated core assemblies for electrical devices and in particular relates to a laminated stator assembly for a dynamo-electric machine.

An object of the invention is to provide an improved laminated core construction and a method of manufacturing the same.

A further object of the invention is to provide an improved laminated stator assembly for a dynamo-electric machine wherein the laminations of the assembly are welded together by a weld line, or multiple weld lines, formed by fusion of a thin web provided at the outer peripheral surface of the laminated assembly.

Still another object of the invention is to provide a method for manufacturing a laminated core assembly, and particularly a laminated stator assembly for a dynamo-electric machine wherein the laminated assembly is bonded by fusion of a thin web provided by specially contoured passages positioned immediately adjacent the outer periphery of the stator assembly, fusion of the metal in the web formed at the periphery of the stator assembly by the contoured passages effecting a separation of the peripheral surface of the laminated assembly with resultant fusion of the edges created at opposite sides of the contoured passages.

Further objects and advantages of the present invention will be apparent from the following description, reference being had to the accompanying drawings wherein a preferred form of the invention is clearly shown.

Figure 1:
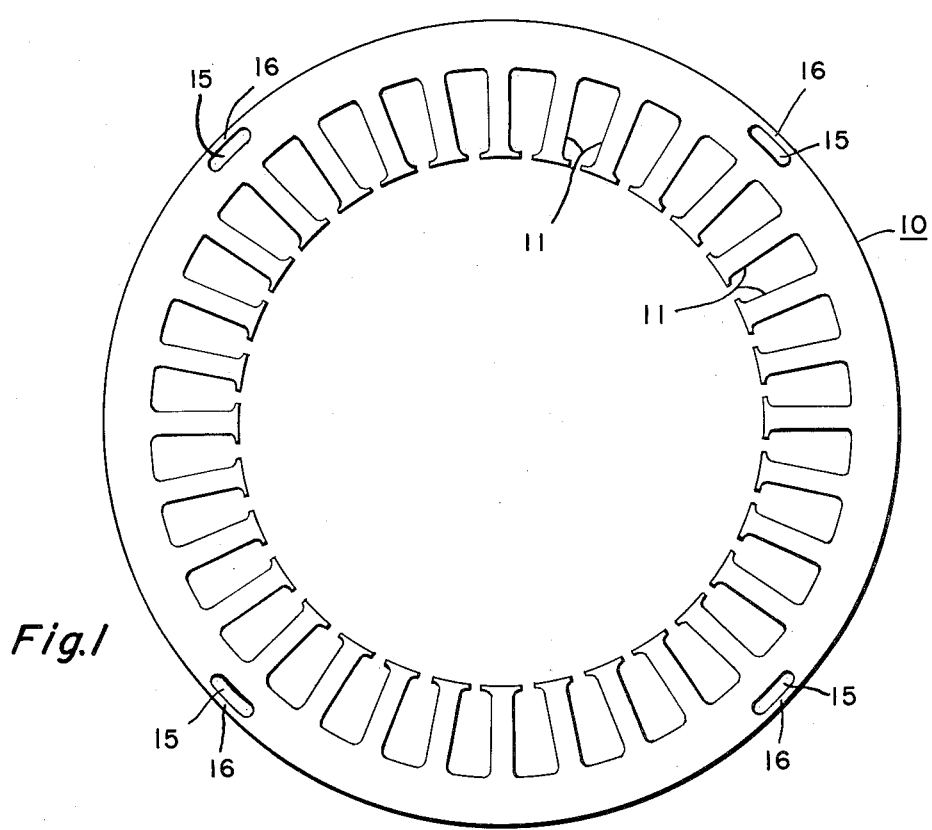
Figure 1 is a plan view of a stator lamination for a dynamo-electric machine incorporating features of the invention.
Figure 2:
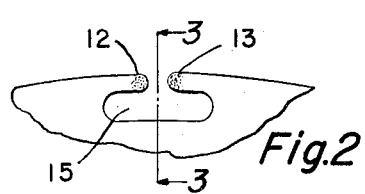
Figure 2 is an elevational end view of a portion of a stator assembly illustrating the weld lines or lines of fusion bonding the stator laminations together.

In Figure 1 of the drawings there is illustrated a laminate for incorporation in a laminated stator for a dynamo-electric machine. The laminate 10 is formed of magnetic material, as conventional, and is provided with a plurality of winding slots 11 radiating from the axis of the laminate 10.

Figure 3:
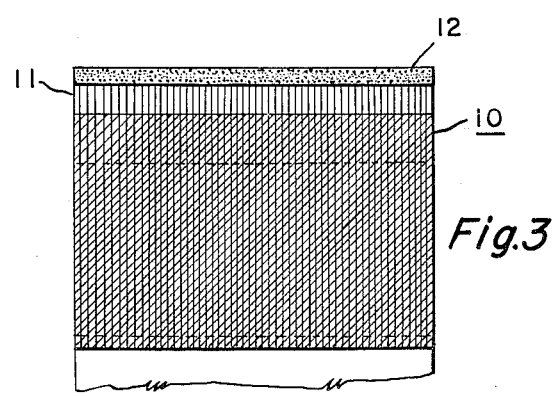
Figure 3 is a cross sectional view of a laminated stator assembly taken along line 3—3 of Figure 2.
Figure 5:
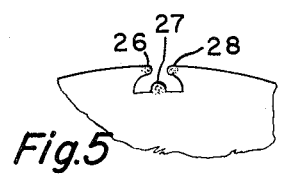
Figure 5 is an end elevational view of a stator assembly for a dynamo-electric machine utilizing the modified laminate structure illustrated in Figure 4.

A stator for a dynamo-electric machine is composed of a multiplicity of the laminates 10, as illustrated in Figure 3, the laminated structure providing the desired magnetic core for the stator windings placed in the winding slots 11.

In this invention the stator laminations 10 are bonded together by the weld lines or lines of fusion 12 and 13 at the outer periphery of the stator assembly.

To provide the lines of fusion 12, and 13, each of the laminates 10 is provided with a plurality of openings 15 immediately adjacent the outer periphery of the laminate. These openings are preferably positioned equidistantly around the periphery of the laminate to provide for equidistant spacing of the weld or fusion lines 12 and 13. Actually, the weld or fusion lines 12 or 13 form multiple fusion or weld lines at each of the openings 15, as will hereinafter be described.

As illustrated in Figure 1, the openings 15 are elongated peripherally of the laminate 10 so that the contour of the opening 15 provides a thin web 16 at the periphery of the laminate. It will be noted that the opening 15 is contoured to effect an equivalent web area on both sides of a center line radiating from the axis of the laminate 10 through the openings 15. The openings 15 and the winding slots 11 of the laminates are in axial alignment in the stator assembly whereby to provide longitudinally axially extending passages through the laminated assembly.

To effect the fusion or weld lines 12 and 13, a welding or fusion heat is applied to the web 16 at a point intermediate between opposite ends of the opening 15. The welding or fusion heat melts the web 16 at a point intermediate opposite ends of the opening 15 whereby to effect a separation of the lamination at the periphery thereof by such melting of the web. When the web is thus melted, two edges are formed at the periphery of the lamination which immediately fuse to form the line of fusion or weld 12 or 13 simultaneously.

The welding or fusion heat is applied from one end of the stator assembly to the other to progressively melt the web 16 from one end of the stator to the other end thereby progressively forming simultaneously the multiple weld lines, or lines of fusion, 12 and 13 which bond the laminations 10 into a permanent assembly.

With the fusion heat applied to the web 16 radially outside of the openings 15, the fusion or welding heat in the web 16 does not materially affect the magnetic characteristics of the laminations radially inwardly of the opening 15. Also, since the lines of fusion or weld are radially outside the opening 15, and immediately at the periphery of the laminated assembly, the slight short circuiting that may be effected by the weld or fusion lines is relatively ineffective on the efficiency of the assembly because of the very small cross-sectional area of the fusion or weld lines and the high resistance of the weld.

Since the heat of fusion is applied to the periphery of the stator laminated assembly radially outwardly of the opening 15, and substantially intermediate of the ends thereof, the heat of fusion will not be transferred into the main body of the stator assembly to any great degree. Thus, warping of the stator assembly resulting from welding heat and subsequent shrinkage of metal is substantially eliminated.

Figure 4:
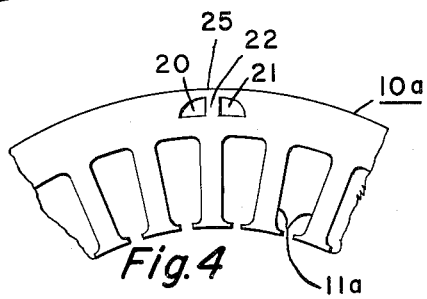
Figure 4 is an elevational view of a stator lamination illustrating a modified arrangement of the feature of the invention.

In Figure 4 there is illustrated a slightly modified arrangement of the openings provided at the periphery of the individual laminates by which three lines of fusion or weld can be created. In this arrangement the laminate 10a having the winding slots 11a is provided with a pair of adjacent openings 20 and 21 immediately adjacent the outer periphery of the laminate. The openings 20 and 21 are separated by a small tab 22 positioned intermediate opposite ends of the openings 20 and 21.

The laminations 10a are assembled in the same manner as the laminations 10 whereby the passages 20 and 21 in the several laminations are aligned longitudinally to effect longitudinally extending passages at the periphery of the laminated assembly.

To effect fusion of the web 25 provided at the periphery of the laminates 10a, fusion or welding heat is applied to the assembly at the periphery thereof radially outwardly of the tab 22. The heat of fusion melts the web 25 as well as the radially outward end of the tab 22 which results in three lines of fusion 26, 27 and 28 being created longitudinally along the periphery of the laminated assembly.

While the form of embodiment of the invention as herein disclosed constitutes a preferred form, it is to be understood that other forms might be adopted as may come within the scope of the claims which follow.

What is claimed is as follows:

1. In the method of manufacturing for a core member having winding slots in one edge thereof, the steps comprising, assembling together in axial aligned engaging relation a plurality of sheet laminations each having an opening from which winding slots radiate with the winding slots axially aligned and having other axially aligned openings immediately adjacent the outer peripheral edge of the laminations to effect a longitudinally extending passage through the lamination assembly contoured to provide a thin heat fusible web at the peripheral edge of the laminations, and applying a fusing heat to the said web to effect separation of the periphery of the laminations at the said opening concurrently with fusion of the laminations along the opening edges thus created.

2. A dynamo-electric machine core member composed of a plurality of sheet laminations each having an opening from which winding slots radiate with the openings in the winding slots of the laminations respectively aligned axially, a longitudinally extending passage through the lamination assembly immediately adjacent the outer periphery thereof and forming therewith oppositely disposed ledges positioned at opposite sides of the passage, said ledges each forming a fused weld line extending longitudinally along the periphery of the lamination assembly to retain the laminations assembled permanently.

3. A dynamo-electric machine core member composed of a plurality of sheet laminations each having an opening from which winding slots radiate with the openings in the winding slots of the laminations respectively aligned axially, a longitudinally extending passage through the lamination assembly immediately adjacent the outer periphery of the assembly and contoured to form therewith a longitudinally extending ledge at each of opposite sides of the said passage with each of said ledges having substantially equivalent cross-sections, each of said ledges comprising a weld line extending longitudinally of the lamination assembly to retain together thereby said laminations.

References Cited in the file of this patent

UNITED STATES PATENTS 2,448,785    Dolan _____ Sept. 7, 1948